United States Patent
Fennewald et al.

(10) Patent No.: US 7,257,464 B2
(45) Date of Patent: Aug. 14, 2007

(54) VARIABLE WATTAGE CONTROL SYSTEM

(75) Inventors: Kenneth J. Fennewald, St. Louis, MO (US); Louis P. Steinhauser, St. Louis, MO (US)

(73) Assignee: Watlow Electric Manufacturing Co., St. Louis, MO (US)

( * ) Notice: Subject to any disclaimer, the term of this patent is extended or adjusted under 35 U.S.C. 154(b) by 336 days.

(21) Appl. No.: 10/644,719

(22) Filed: Aug. 20, 2003

(65) Prior Publication Data

US 2004/0039487 A1 Feb. 26, 2004

Related U.S. Application Data

(60) Provisional application No. 60/404,997, filed on Aug. 21, 2002.

(51) Int. Cl.
G05B 13/00 (2006.01)
(52) U.S. Cl. ............... 700/278; 700/276; 700/297; 700/299; 219/494
(58) Field of Classification Search ............... 700/275, 700/276, 278, 286, 287, 291, 295, 297, 299, 700/300; 219/494, 497, 501, 504; 236/68 C, 236/68 R; 374/109
See application file for complete search history.

(56) References Cited

U.S. PATENT DOCUMENTS

| | | | |
|---|---|---|---|
| 3,708,652 A | 1/1973 | Salway-Waller | |
| 3,752,956 A | 8/1973 | Cahill et al. | |
| 4,072,848 A | 2/1978 | Johnson et al. | |
| 4,168,491 A * | 9/1979 | Phillips et al. | ........... 700/300 |
| 4,420,113 A | 12/1983 | Lacroix | |
| 4,582,982 A | 4/1986 | Peigari | |
| 4,667,481 A * | 5/1987 | Watanabe et al. | ........... 62/235 |
| 4,894,520 A | 1/1990 | Moran | |
| 5,520,329 A * | 5/1996 | Clinton et al. | ........... 374/109 |
| 5,624,591 A | 4/1997 | Di Trapani | |

(Continued)

FOREIGN PATENT DOCUMENTS

EP 0420523 4/1991

OTHER PUBLICATIONS

Whitaker, Tim, "Fact or Fiction—LEDs don't produce heat", May 2005, LEDs Magazine, http://ledsmagazine.com/articles/features/2/5/8/1.*

Primary Examiner—Zoiila Cabrera
Assistant Examiner—Charles Kasenge
(74) Attorney, Agent, or Firm—Brinks Hofer Gilson & Lione

(57) ABSTRACT

A variable wattage control system is disclosed for providing varying wattage levels for a power-receiving device. The power-receiving device is operatively associated with a sensing means that communicates with a temperature controller for comparing the sensed temperature with a predetermined set point. If the sensed temperature falls outside the set point, the temperature controller directs a power control means to turn on the heating element at a specific wattage level. The variable wattage control system may include a micro-controller contained in either the temperature controller, power controller or a separate module which determines a power output scaling factor based on the percentage of the full line voltage being applied to the power-receiving device and then scaling the power output. The power output scaling factor determines the maximum percentage power to be applied to the power-receiving device such that a single device may be driven at different power levels for various applications.

29 Claims, 12 Drawing Sheets

U.S. PATENT DOCUMENTS

| | | |
|---|---|---|
| 5,656,189 A | 8/1997 | Crockett et al. |
| 5,672,289 A | 9/1997 | O'Neill |
| 6,039,702 A * | 3/2000 | Cutler et al. .................. 601/15 |
| 6,246,831 B1 | 6/2001 | Seitz et al. |
| 6,341,599 B1 | 1/2002 | Hada et al. |
| 6,355,916 B1 * | 3/2002 | Siefert ........................ 219/494 |
| 6,678,290 B2 * | 1/2004 | Yoshida et al. ........ 372/29.021 |

* cited by examiner

VARIABLE WATTAGE CONTROL SYSTEM

CROSS REFERENCE TO RELATED APPLICATION

This application is based upon U.S. Provisional Patent Application Serial No. 60/404,997, entitled "Variable Wattage Heater Control System", filed Aug. 21, 2002, the contents of which are incorporated herein by reference in their entirety and continued preservation of which is requested.

BACKGROUND OF THE INVENTION

1. Field of the Invention

The present invention relates to a control system, and particularly to a variable wattage control system. More specifically, the present invention relates to a variable wattage control system for a power-receiving device, such as the heating element.

2. Prior Art

Control systems for controlling the power output applied to a heating element or other power-receiving device are well known in the art. In particular, U.S. Pat. No. 3,752,956 to Cahill et al.; U.S. Pat. No. 4,582,982 to Peigari; U.S. Pat. No. 4,894,520 to Moran; and U.S. Pat. No. 5,624,591 to Di Trapani all disclose some type of controller for controlling the power output to a heating element. Specifically, the Peigari reference teaches an SCR power controller in which the output voltage to a resistance heater is varied in accordance with outside temperature, while the Moran reference applies a variable current to a resistance heater corresponding to variations in supply voltage by using a pulse width modulator which controls the timing of a switching device in order to control the flow of current through the resistance heater. Additionally, the Cahill et al. reference discloses a fixing circuit in arrangement with a gated triac and feeding circuits for controlling power output to a heating element. Finally, the Di Trapani reference teaches a control circuit comprising a triac for modulating the current supply to a heating element such that the flow of current is interrupted thereto when a predetermined threshold is reached.

However, further enhancements in power control systems are desirable. More specifically, there is a need in the art for a power controller that can convert at least one power-receiving device, such as a heating element, having a single wattage rating to a heating element having multiple wattage applications. There is a further need in the art for a controller that has the ability to limit the maximum wattage to a value less than that which would be provided at full line voltage, and which provides a scaling function for re-scaling the power output to the heating element in order to better control the power output. Further, there appears a need for a controller that permits manual input of various parameters for determining the desired scaling function by the user. Further, there appears a need for a method of enhancing phase angle power control at low conduction angles.

OBJECTS AND SUMMARY OF THE INVENTION

The primary object of the present invention is to provide a variable wattage control system for controlling the power output to a power-receiving device by determining a scaling function that re-scales the power output such that the maximum wattage delivered to the power-receiving device can be less than that which would be provided at full line voltage. It will be understood accordingly that the new variable wattage control system is capable of scaling power to the power-receiving device even though the power ratings thereof may be less, or even considerably less than the power delivery capability of the new variable wattage control system.

Yet another object of the present invention is to provide a variable wattage control system that uses a single heater resistance value at many different wattage levels.

Yet another further object of the present invention is to provide a variable wattage control system that allows the use of a power-receiving device at a lower than normal resistance by limiting the maximum voltage and current to a value less than that which would be supplied at full line voltage. The use of lower than normal resistance values can allow a power-receiving device to be designed with a resistive element of greater than normal cross section, which can result in an increase in the life of the device.

Another further object of the present invention is to provide a variable wattage control system in which the power output of either the temperature or power controller is capable of being re-scaled.

A further object of the present invention is to provide a module for a variable wattage control system which is operatively associated with the power and temperature controllers of the control system for re-scaling the power output to the power-receiving device.

Another object of the present invention is to provide a novel enhancement of phase angle power control by allowing "off" cycles to occur between phase-angle-fired "on" cycles, thereby allowing an increase in the conduction angle of the phase-angle-fired "on" cycles.

The terms "heater" or "heating element" or "heat-producing element" or "heat producing means" as used herein are intended to mean generically any type of power-receiving device, whether as a single or plural unit, which is electrically powered, and may often be found in industrial heater context as an ohmic device comprising an electrically resistive element driven electrically to produce heat. However, the present invention contemplates that a power-receiving device may encompass any type of electrically powered device including, but not limited to, a heating element or the like.

The terms "power control" or "power controller" or "power control means" as used herein are intended to mean generically any type of power control device normally found in heater control systems. Such devices include, but are not limited to, mechanical power switching devices (e.g., contactors, mercury displacement relays, etc.) and semiconductor power control (e.g., phase angle control, burst firing, pulse mode, pulse width modulation (PWM), etc., including conversion from AC power to DC and use of PWM from DC supply).

Another object of the present invention is to provide a variable wattage control system having a software-controlled subsystem that permits automatic or manual user input of various parameters into the variable wattage control system in order to determine a scaling function.

The terms "software" or "software subsystem" or "computer implemented software subsystem" or "software-controlled" as used herein are intended to include, but not limited to, imbedded software, which is also known as "firmware".

In brief summary, the present invention overcomes and substantially alleviates the deficiencies present in the art by providing a variable wattage control system comprising a power-receiving device connected to a power controller which is linked to either a DC or AC power source for supplying power to the device. A sensing means is operatively associated with the power-receiving device for taking temperature readings and communicating those readings to a temperature controller. In the preferred embodiment, after the temperature readings are communicated to the temperature controller by the sensing means, the temperature controller then provides a re-scaled output to the power controller which limits and re-scales the amount of voltage applied to the power-receiving device. This method of limiting applied line voltage to the device and re-scaling the output sent to the device by the power controller permits multiple wattage values to be obtained from a single resistance value of the device. In other words, use by the variable wattage control system of a scaling factor based on the percentage of a full line voltage determines the maximum percentage power to be applied to the power-receiving device such that the device is not driven at a power level greater than its power level rating. The variable wattage control system of the present invention can be used accordingly to provide control of a wide variety of power-receiving devices such as heating elements, where the power rating of such elements or devices may be as great as that of the variable wattage control system or in fact may be substantially less, for the operation of the variable wattage control system is protectively scaled for output according to the specifications of the element or device.

In accordance with one aspect of the present invention, a computer-implemented software subsystem is provided that permits the user to manually enter line voltage, element resistance (e.g., the ohmic value of a heater) and desired maximum power, in order to calculate a desired scaling factor. This scaling factor is applied by the software subsystem to re-scale the voltage output to the power-receiving device from the power controller. In this way, the user may change the scaling factor applied to the voltage output of the same power-receiving device in order to obtain multiple maximum wattage values therefrom, or else to power many possible elements or devices, each having a different rating.

The terms "computer" or "computer implemented" or "micro-controller" as used herein are intended to include microprocessors, micro-controllers, digital signal processors, programmable logic arrays, and any other device capable of performing programmed instructions.

Preferably, the software subsystem for determining the scaling factor is found in the temperature controller; however, the present invention contemplates that the software subsystem can be contained within the power controller or other suitable device. The scaling factor function may alternatively be contained in a special module arrangement which is operatively associated between the power controller and the power-receiving device, or between the voltage source and the power controller, or between the temperature controller and the power controller for accomplishing the same function. The scaling factor of such a special module may be pre-set at the place of manufacture or may be field adjustable.

As noted above, the variable wattage control system of the present invention uses a single heater resistance value with the power-receiving device to achieve many different wattage values by controlling the voltage and current applied to the device. Further, the present invention controls the line voltage and current applied to the power-receiving device to values less than would otherwise be supplied at full line voltage and re-scales this output to the device. For example, a user that requires the same physical size heating element in four different voltage/wattage combinations: 500 watt and 600 watt at both 120V and 240V would have to purchase the following four different heating elements having the same physical size: (A) 500 watts, 120V, 28.8 ohms; (B) 500 watts, 240V, 115.2 ohms; (C) 600 watts, 120V, 24.0 ohms; and (D) 600 watts, 240V, 96.0 ohms. By using the variable wattage control system of the present invention, these four types of heating element parameters A, B, C, and D can be effectively replaced with heating elements of a single resistance value by limiting the heating element voltage to a value less than full line voltage and re-scaling the heating element voltage to supply the desired wattage. The variable wattage control system of the present invention may work with any kind of known techniques of AC or DC semiconductor power control (e.g., phase angle control, burst firing, pulse mode, pulse width modulation (PWM), power transistors, etc., including conversion from AC power to DC and use of PWM from DC supply) or mechanical power switching devices (e.g., contactors, mercury displacement relays, etc.). When used with a phase angle power control system, the present invention may include a method of improving phase angle power control in order to enhance the accuracy of phase angle power control at low conduction angles. The present invention may use phase angle power control, but not does not necessarily require the use of such a power control system.

Additional objects, advantages and novel features of the invention will be set forth in the description which follows, and will become apparent to those skilled in the art upon examination of the following more detailed description and drawings in which like elements of the invention are similarly numbered throughout.

DETAILED DESCRIPTION OF THE INVENTION

Figure 1:
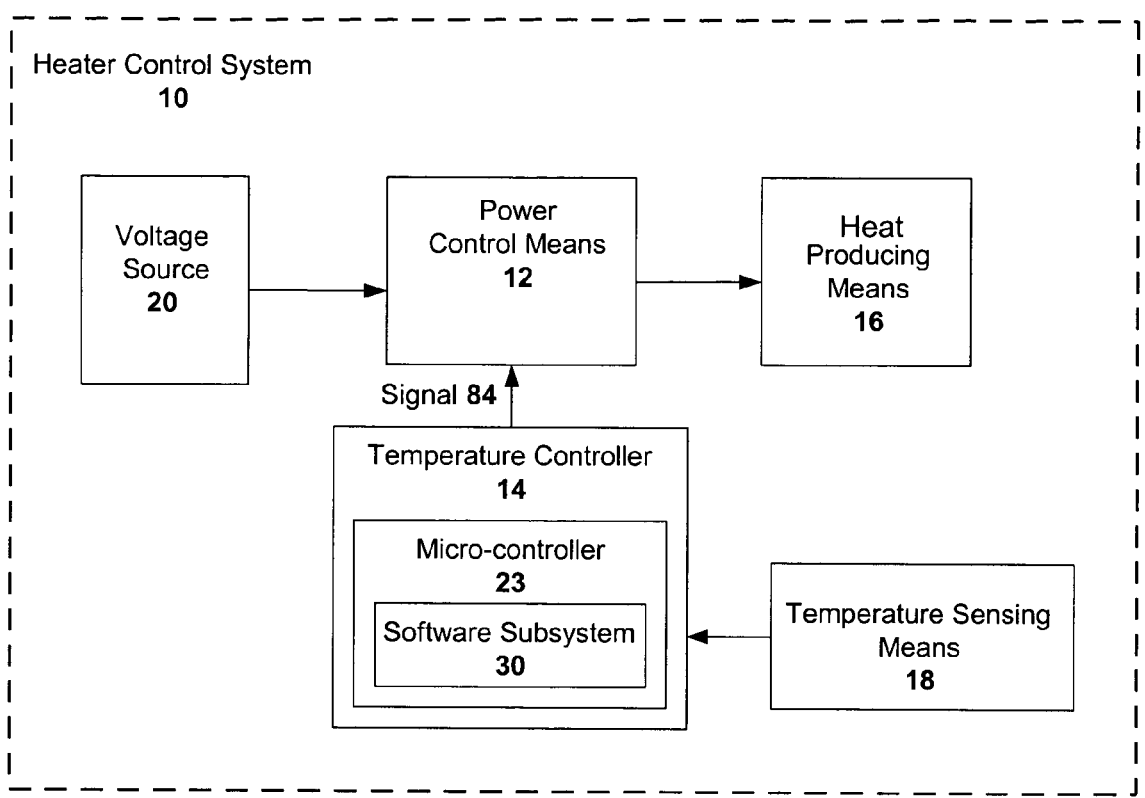
FIG. 1 is a simplified block diagram of the preferred embodiment of the variable wattage control system showing the control system implemented in a temperature controller according to the present invention.

Referring to the drawings, the preferred embodiment of the variable wattage control system is illustrated and generally indicated as 10 in FIG. 1. Variable wattage control system 10 comprises a power controller 12 linked to a AC or DC voltage source 20 for providing a power output to a power-receiving device, such as a heat-producing means 16. A sensing means 18 senses the environmental temperature associated with the heat-producing means 16 and communicates temperature readings to a temperature controller 14 which is operatively associated with the power controller 12.

According to one aspect of the present invention, variable wattage control system 10 provides a means for controlling the power output from the power controller 12 to the heat-producing means 16 by limiting and re-scaling the amount of line voltage applied to the heat producing means 16. Preferably, temperature controller 14 includes a micro-controller 23 which embodies a software subsystem 30 (FIG. 2) for calculating and communicating a signal to the power controller 12 that controls the power output to the heat-producing means 16 as shall be discussed in greater detail below. In the alternative, if the system does not include a software subsystem 30 to implement the scaling function, the scaling function may be preset by the manufacturer or may be field adjustable, such as through the use of one or more switches.

Figure 2:
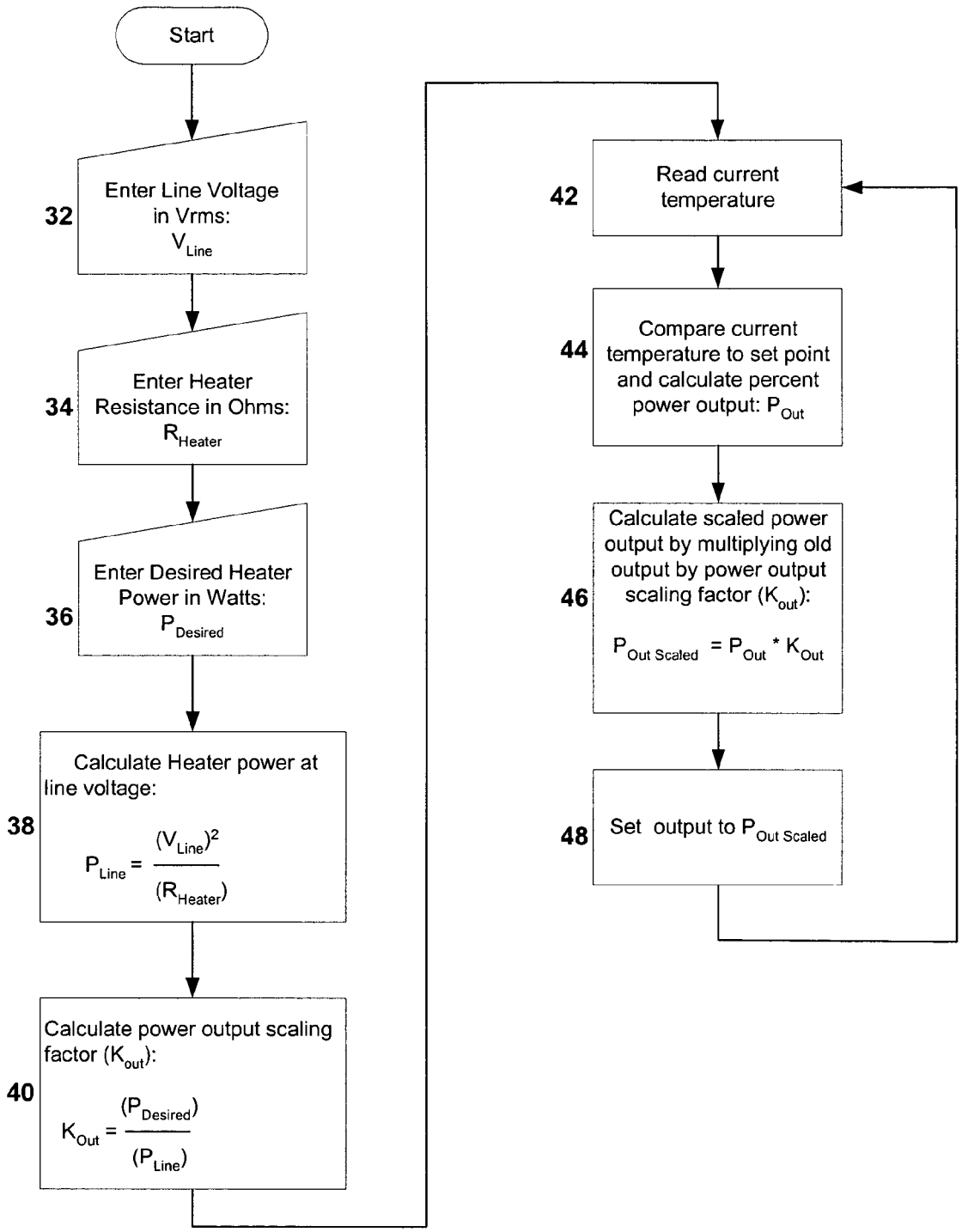
FIG. 2 is a flow chart illustrating the method for determining the scaling factor and re-scaling the power output to the power-receiving device by the temperature controller according to the present invention.

Referring to FIG. 2, software subsystem 30 provides a routine that instructs the temperature controller 14 to obtain new input from the user through a user interface (not shown) in order to generate a power output scaling factor, $K_{out}$, and produce a signal 84 to power controller 12. The term "user interface" as used herein is intended to include manual inputs (e.g., keypads), and electronic means (e.g., wired or wireless communication buses and electronic storage media) or any suitable means to transfer the pertinent information to the software subsystem 30. At steps 32, 34 and 36, respectively, the user enters the line voltage (in Vrms) produced by voltage source 20, the resistance value (in Ohms) of heating-producing means 16, and the desired power (in Watts) to be applied to heating-producing means 16. Once the line voltage, resistance value and desired power values are entered into the temperature controller 14, the micro-controller 23, at step 38, calculates the power at full line voltage using the following equation:

$$P_{line} = \frac{(V_{line})^2}{R_{heater}}$$

After $P_{line}$ is determined, the micro-controller 23, at step 40, calculates the power output scaling factor, $K_{out}$, using the following equation:

$$K_{out} = \frac{P_{desired}}{P_{line}}$$

In the alternative, the power output scaling factor, $K_{out}$, may be entered through the user interface instead of calculated in the software sub-system 30. Once the power output scaling factor has been determined, the sensor 18 takes a temperature reading and communicates that reading to the micro-controller 23 at step 42. The micro-controller 23, at step 44, compares the temperature reading to a temperature set point previously established by the user. The required percentage power output level, $P_{out}$, is determined by the temperature controller 14 in the normal manner at step 44, and then the micro-controller 23 calculates a scaled percentage power output, $P_{out\ Scaled}$, at step 46, using the following equation:

$$P_{out\ Scaled} = P_{out} * K_{out}$$

After the scaled power output, $P_{out\ Scaled}$, has been calculated, the micro-controller 23 instructs the temperature controller 14 to communicate a signal 84 to the power controller 12 establishing the desired power output to the heat producing means 16. Power controller 12 receives signal 84 and provides the proper power output to the heat-producing means 16. Signal 84 is a control signal having a signal level appropriate for communicating the desired power output to the power controller 12. The level of signal 84 signifies the level of power output to be provided by power controller 12 to heat-producing means 16. For example, a resistive heating element of 24 Ohms is desired to be operated as a 1200 Watt heating element at a line voltage of 240 Vrms. This 24 Ohm heating element supplies 2400 Watts at full line voltage. A temperature controller 14 with a linear 4-20 mA output range, without applying the scaling factor, $K_{out}$, of the present invention for re-scaling the power output at full line voltage, the strength of signal 84 for a 4 mA signal=0 power level; 12 mA signal=50% power level or 1200 Watts; and 20 ma signal=100% power level or 2400 Watts representing full line voltage being applied to the heat producing means 16. When the scaling factor, $K_{out}$ is calculated to be 0.5 and is applied to this scheme 4 mA still represents 0 power level; however, 8 mA=50% power level or 600 Watts and 12 mA=100% power level or 1200 Watts. Therefore, a 12 mA signal 84 to the power controller 12 will provide a scaled power output of 100% of the desired wattage (1200 Watts) or 50% of the full line power of 2400 Watts. However, the present invention contemplates that other scaling factors will produce different schemes, for example, a 0.25 or 25% scaling factor will produce a 8 mA signal 84 to the power controller 12 representing a scaled power output of 100% or 25% of the full line voltage power.

After $P_{out\ Scaled}$ is determined, the power controller 12 sets the scaled power output to the heat-producing means 16 to a level that equals $P_{out\ Scaled}$ in step 48. However, if no new scaling factor is being implemented, the software subsystem 30 returns to step 42 for another temperature reading and power output calculation. The loop from step 48 back to step 42 is repeated until the user interrupts the loop, such as to enter new data in steps 32 through 36.

Figure 3:
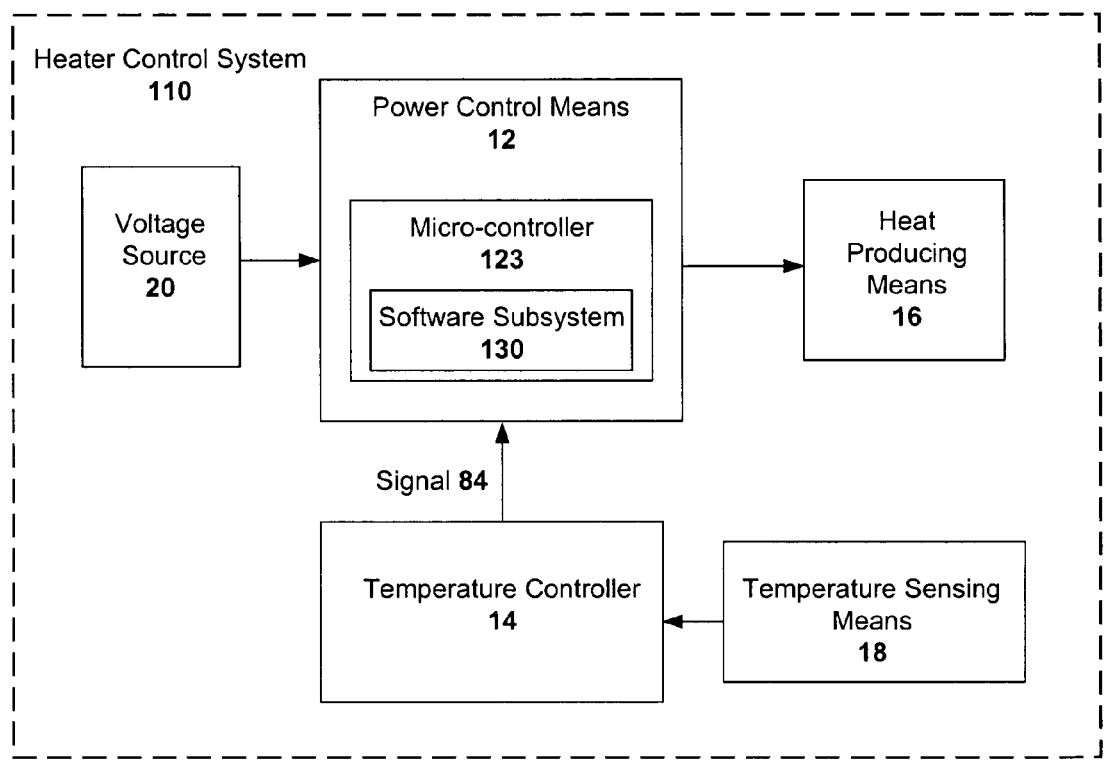
FIG. 3 is a simplified block diagram of an alternative embodiment of the variable wattage control system showing the control system implemented in a power controller according to the present invention.

Referring to FIG. 3, an alternative embodiment 110 of the variable wattage control system is illustrated. In this particular embodiment, variable wattage control system 110 comprises substantially the same arrangement as the preferred embodiment, except software subsystem 130 is found in a micro-controller 123 which is operatively associated with the power controller 12, rather than the temperature controller 14. In the alternative, if the variable wattage control system 110 does not include a software subsystem 130 to implement the scaling function, the scaling function may be preset by the manufacturer or may be field adjustable, such as through the use of one or more switches.

Figure 4:
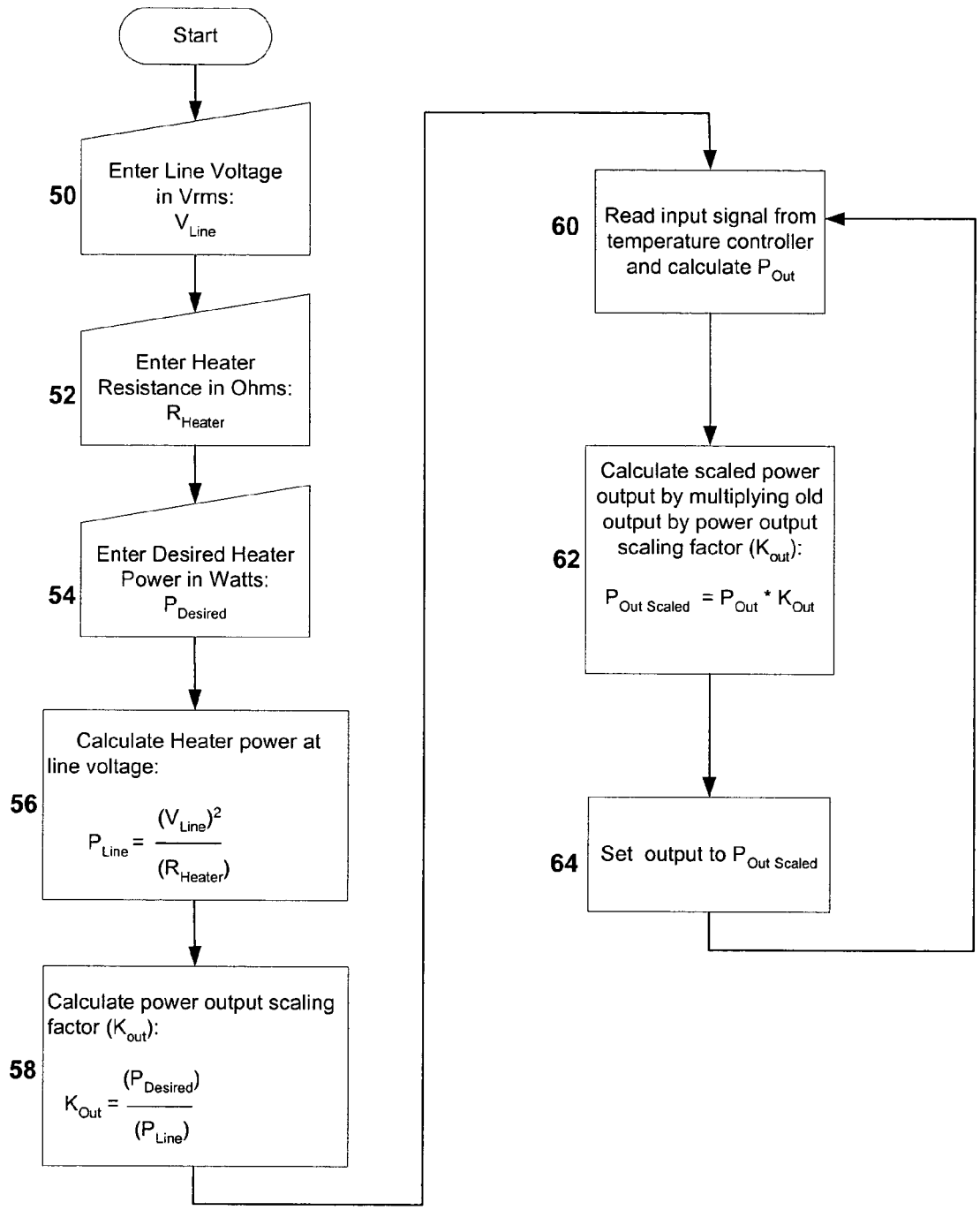
FIG. 4 is a flow chart illustrating the method for determining the scaling factor and re-scaling the power output to the power-receiving device by the power controller according to the present invention.

As shown in FIG. 4, software subsystem 130 provides a routine that instructs the power controller 12 to obtain new input from the user through a user interface (not shown) at controller 12 in order to generate a power output scaling factor, $K_{out}$, and produce a scaled power output to the heat-producing means 16. At steps 50, 52, and 54, respectively, the user enters the line voltage (in Vrms) produced by voltage source 20, the resistance value (in Ohms) of heat-producing means 16, and the desired power (in Watts) to be applied to heat-producing means 16. In the alternative, power controller 12 may automatically read the existing line voltage from voltage source 20 as well as the resistance value of heat-producing means 16 without user input. Once the line voltage, resistance value and desired power values are entered into the power controller 12, the micro-controller 123, at step 56, calculates the power at full line voltage using the same equation for determining $P_{line}$ as was calculated in the preferred embodiment. After $P_{line}$ is determined, the micro-controller 123, at step 58, calculates the power output scaling factor, $K_{out}$, also using the same equation utilized in the preferred embodiment. In the alternative, the power output scaling factor, $K_{out}$, may be entered through the user interface instead of calculated in the software sub-system 130. Once the power output scaling factor has been determined, the power controller 12 reads a signal 84 communicated by the temperature controller 14. Signal 84 is a control signal having a level which represents the percentage power output required to reach a certain set point temperature established in the temperature controller 14. This is based on the temperature reading communicated by the sensing means 18, comparing that reading against a set point temperature and providing the above signal 84 to the power controller 12. After the micro-controller 123 reads the signal 86 sent by the temperature controller 14 a new percentage power output, $P_{out\ Scaled}$, is calculated at step 62, using the same equation noted in step 46. After $P_{out\ Scaled}$ is determined, the power controller 12 sets the power output to the heat-producing means 16 to a level that equals $P_{out\ Scaled}$. However, if no new power output scaling factor is being implemented, the software subsystem 130 returns to step 60 for another temperature controller 14 reading and power output calculation. The loop from step 64 back to step 60 is repeated until the user interrupts the loop, such as to enter new data in steps 50 through 54.

Figure 5:
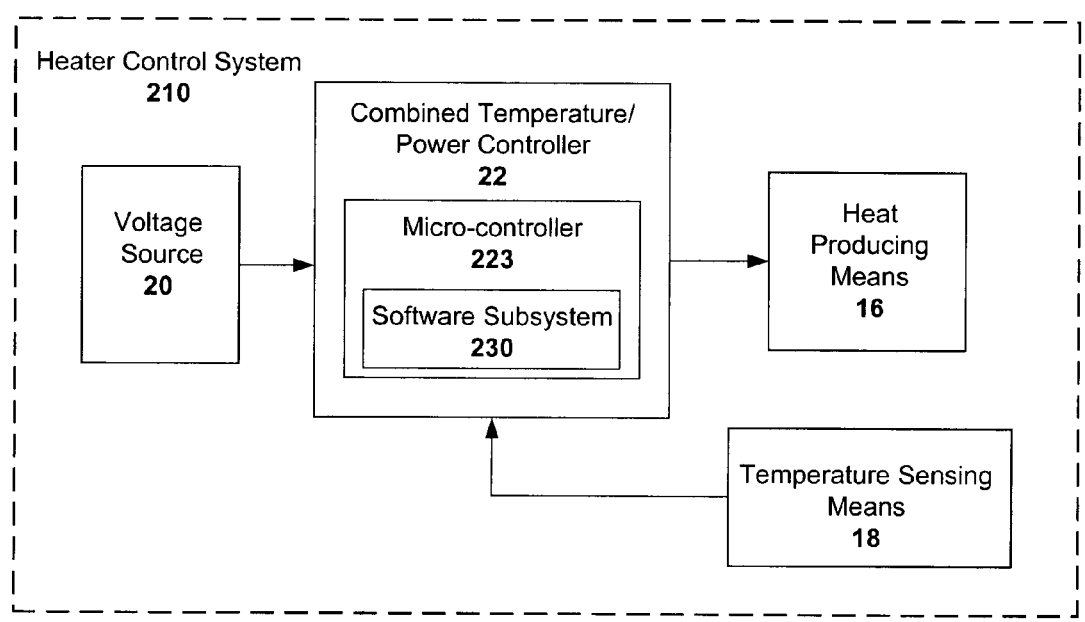
FIG. 5 is a simplified block diagram of an alternative embodiment of the variable wattage control system showing the control system implemented in a combined temperature/power controller according to the present invention.
Figure 6:
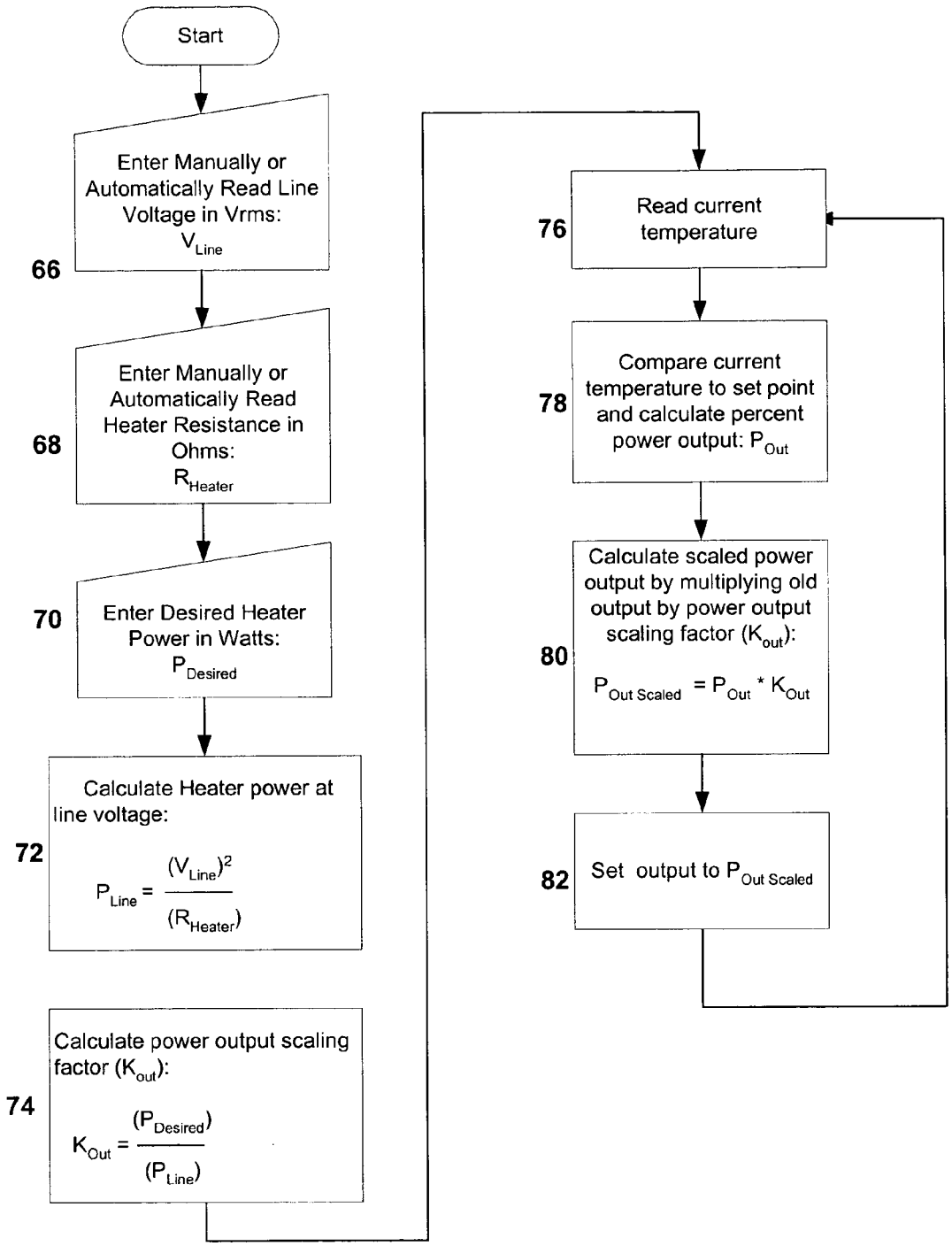
FIG. 6 is a flow chart illustrating the method for manually or automatically determining the scaling factor and re-scaling the power output to the power-receiving device by the combined power/temperature controller according to the present invention.

Referring to FIG. 5, an alternative embodiment 210 of the variable wattage control system is shown. In this arrangement, the power controller 12 and temperature controller 14 are combined into a single combined controller 22 which receives temperature readings from the sensor 18 and provides a limited and scaled power output to the heat-producing means 16. In the alternative, if the system 210 does not include a software subsystem to implement the scaling function, the scaling function may be preset by the manufacturer or may be field adjustable, such as through the use of one or more switches. As shown in FIG. 6, software subsystem 230 provides a routine that instructs the combined controller 22 to obtain new input from the user through a user interface (not shown) at controller 22 in order to generate a power output scaling factor, $K_{out}$, and produce a scaled power output to the heat-producing means 16. At steps 66, 68, and 70, respectively, the user enters the line voltage (in Vrms) produced by voltage source 20, the resistance value (in Ohms) of heat-producing means 16, and the desired power (in Watts) to be applied to heat-producing means 16. In the alternative, combined controller 22 may automatically read the existing line voltage from voltage source 20 as well as the resistance value of heat-producing means 16 without user input.

Once the line voltage, resistance value and desired power values are entered or read into the combined controller 22, the micro-controller 223, at step 72, calculates the power at full line voltage using the same equation for determining $P_{line}$ as was discussed above. After $P_{line}$ is determined, the micro-controller 223, at step 74, calculates the power output scaling factor, $K_{out}$, also using the same equation discussed above. Once the power output scaling factor has been determined, the combined controller 22, at step 76, reads the temperature being communicated by sensor 18. At step 78, the micro-controller 223 compares the temperature reading against a predetermined set point temperature and calculates the required percentage power output level, $P_{out}$, in the normal manner, and then the micro-controller 223 calculates a scaled percentage power output $P_{out\ Scaled}$ at step 80, using the same equation noted in the other embodiments. After the scaled power output $P_{out\ Scaled}$ is determined, the combined controller 22 sets the power output to the heat-producing means 16 to a level that equals the new scaled power output, $P_{out\ Scaled}$. However, as in the other embodiments, if no new power output scaling factor is being implemented, the software subsystem 230 returns to step 76 for another temperature reading and power output calculation. The loop from step 82 back to step 76 is repeated until the user interrupts the loop, such as to enter new data in steps 66 through 70.

Figure 7:
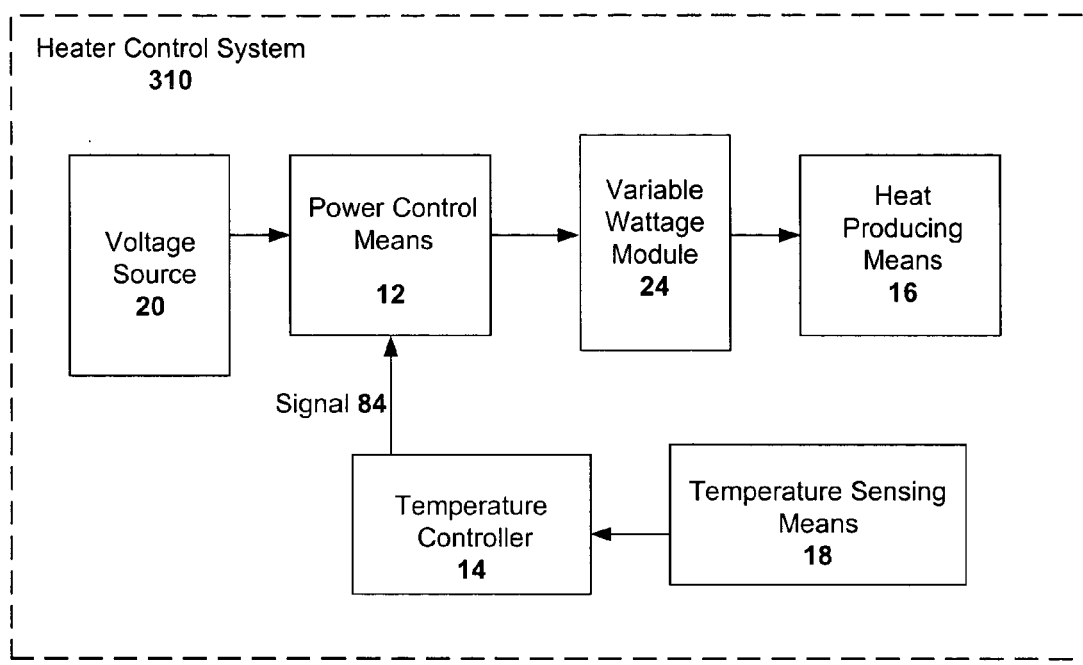
FIG. 7 is a simplified block diagram of an alternative embodiment of the variable wattage control system showing the control system implemented in a module according to the present invention.

Referring to FIG. 7, an alternative embodiment 310 of the variable wattage control system is illustrated. In this particular embodiment, variable wattage control system 310 comprises a module 24 having one connection to power control means 12 and a second connection to heat-producing means 16, while temperature controller 14 provides an output signal 84 to power control means 12. Power control means 12 then supplies a voltage and current to Module 24. As further shown, module 24 then supplies a scaled voltage and current to heat-producing means 16 that is less than the voltage and current that would otherwise be supplied by power control means 12 alone. Although module 24 could be implemented through a micro-controller subsystem, module 24 does not require a micro-controller or software subsystem to calculate and set the scaled power output to the heat producing means 16. The power output scaling factor $K_{out}$ can be preset by the manufacturer or set by manual means on module 24, such as by one or more switches. The power output to the heat-producing means 16 is limited through a solid state device (e.g. triac, SCR, solid state relay, power transistor, etc.) inside the module 24 that is set at a predetermined level in order to limit the power output to heat-producing means 16.

Figure 8:
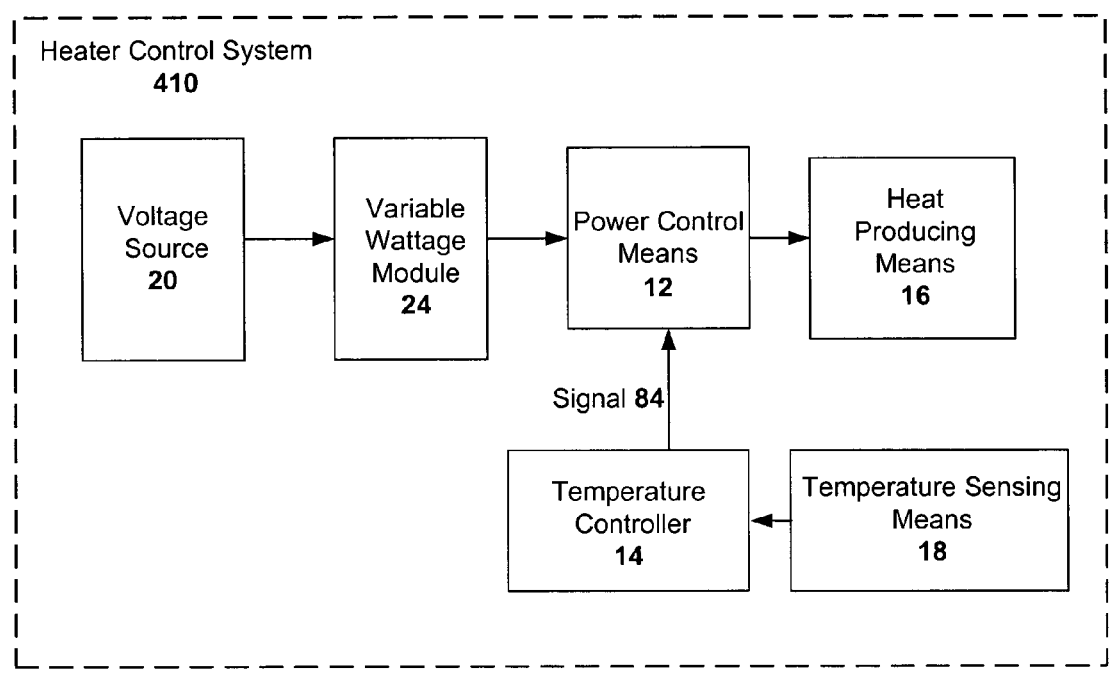
FIG. 8 is a simplified block diagram showing the control system implemented in the module having an alternative circuitry arrangement according to the present invention.

Referring to FIG. 8, an alternative embodiment 410 of the variable wattage control system is illustrated. In this particular embodiment, variable wattage control system 410 comprises a module 24 having one connection to voltage source 20 and a second connection to power control means 12. Voltage source 20 supplies a voltage and current to module 24 which then supplies a scaled voltage and current to power control means 12. As further shown, temperature controller 14 provides an output signal 84 to power control means 12. Power control means 12 then supplies a scaled voltage and current to heat-producing means 16 that is less than the voltage and current that would otherwise be supplied without module 24. Although module 24 could be implemented through a micro-controller subsystem, module 24 does not necessarily require a micro-controller or software subsystem to calculate and set the scaled power output to the heat-producing means 16. The power output scaling factor $K_{out}$ can be preset by the manufacturer or set by manual means on module 24, such as by one or more switches. The power output to the heat-producing means 16 is limited through a solid state device (e.g. triac, SCR, solid state relay, power transistor, etc.) inside the module 24 that is set at a predetermined level in order to limit the power output to heat-producing means 16.

Figure 9:
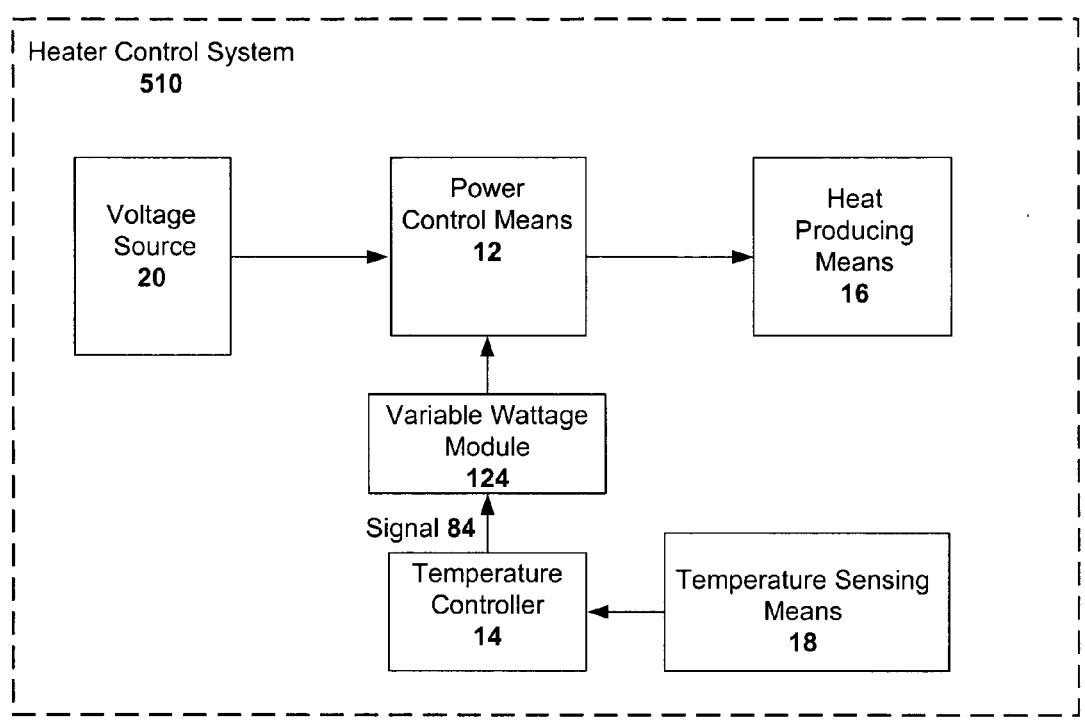
FIG. 9 is a simplified block diagram showing the control system implemented in the module having an alternative circuitry arrangement according to the present invention and FIGS. 10A-C are graphs illustrating the enhancement to a phase angle fire control system according to the present invention.

Referring to FIG. 9, another alternative embodiment 510 of the variable wattage control system is shown. In this particular embodiment, variable wattage control system 510 substantially comprises the same configuration as the variable wattage control system 10 shown in FIG. 1; however, a module 124 is operatively interposed between the output to the temperature controller 14 and the input to the power control means 12. In this configuration, module 124 receives signal 84 from the temperature controller 14 and provides a predetermined limited and scaled output to the power control means 12. Although module 124 could be implemented through a micro-controller subsystem, module 124 does not necessarily require a micro-controller or software subsystem to calculate and set the power output scaling factor $K_{out}$ to the power control means 12. The power output scaling factor can be preset by the manufacturer or set by manual means on module 124, such as by one or more switches.

Figure 10A:
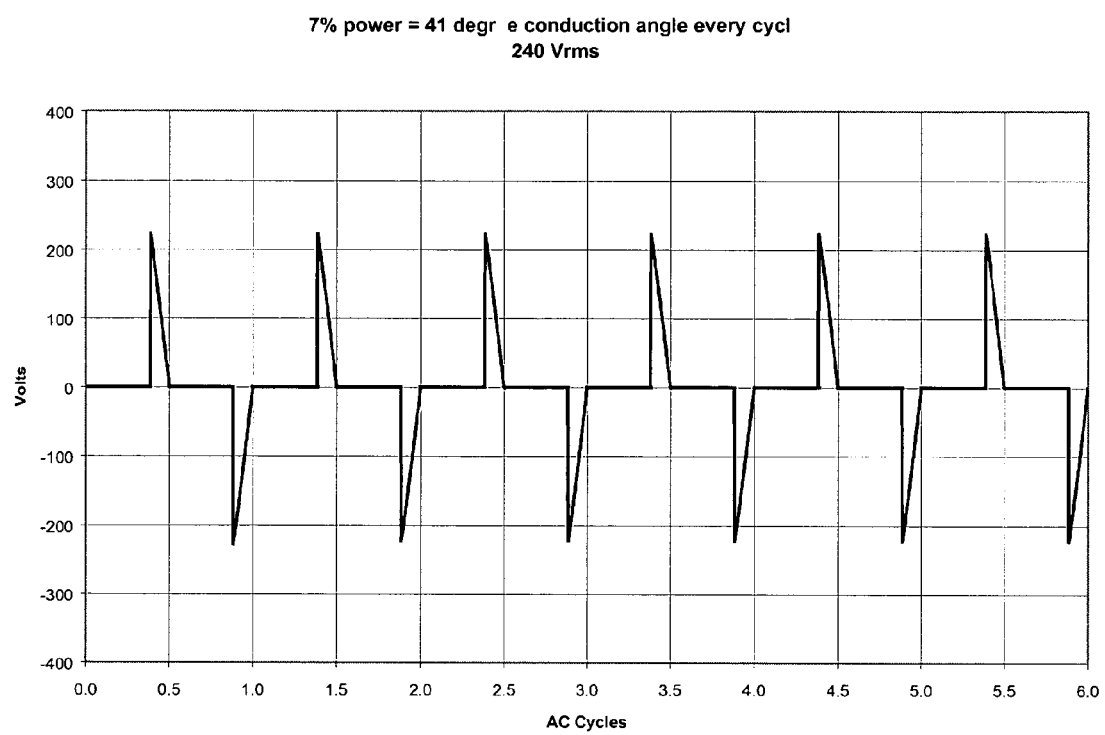
Figure 10B:
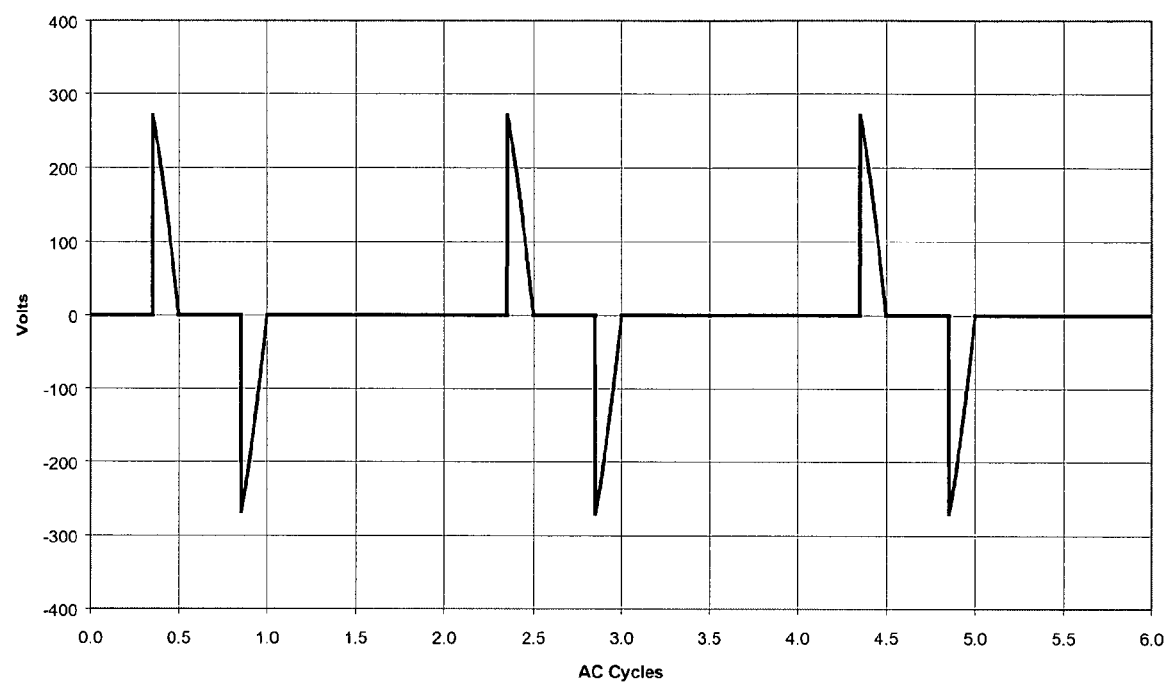
Figure 10C:
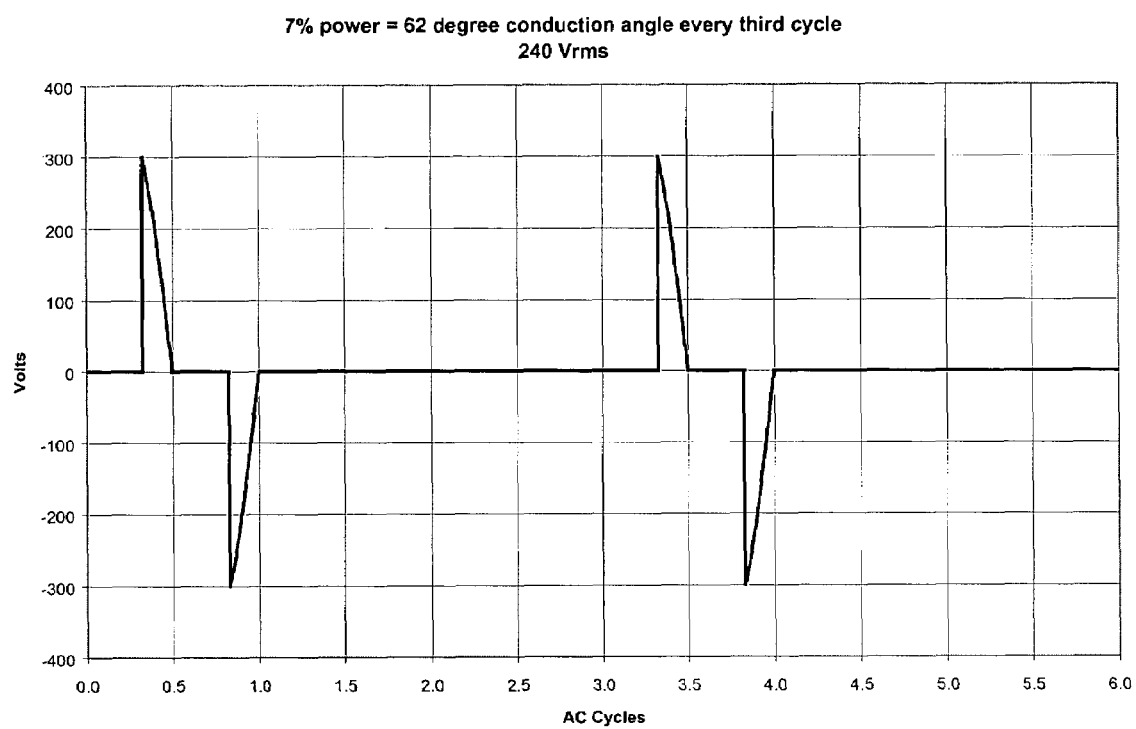

When applied to a phase angle power control system, the present invention results in lower than normal conduction angles due to the power limiting function. Because of the nature of phase angle fired devices, such as SCR's, power control at low conduction angles can be less accurate than power control at higher conduction angles. In order to ameliorate the problems associated with low conduction angles, the present invention offers an enhancement to phase angle power control at low conduction angles, or when phase angle control is combined with burst firing. This allows "off" cycles to occur between phase-angle-fired "on" cycles, thereby allowing an increase in the conduction angle of the phase-angle-fired "on" cycles. Referring to FIG. 10A, a normal phase angle power controller receiving a command for 7% power would have a conduction phase angle of 41 degrees on every ac line cycle. Using the present invention and phase angle firing every other ac line cycle, a 7% power output is attained with a 53 degree conduction angle as illustrated in FIG. 10B. Further, as shown in FIG. 10C, phase angle firing every third ac line cycle using the present invention, a 7% power output is attained with a 62 degree conduction angle. Preferably, this aspect of the present invention is an enhancement to the power control means 12 in FIGS. 1 and 3, or, in the alternative, to combined temperature/power controller 22 shown in FIG. 5 or module 24 shown in FIGS. 7 and 8.

Thus, it is seen that the present invention provides a variable wattage control system 10 for providing varying wattage levels for at least one power receiving device such, as a heat-producing means 16. The control system 10 preferably comprises at least one heat-producing means 16 operatively associated with a temperature sensing means 18; the temperature sensing means 18 communicating with a temperature controller 14 for comparing the sensed temperature with a desired set point; a power control means 12 of the temperature controller 14, for providing energization of the heating element 16 at a selected maximum wattage level; and the temperature controller 14 being operative such that, if the sensed temperature, when compared to the set point, indicates that the control system 10 requires heat, the temperature controller 14 directs a power control means 12 to turn on the heat-producing means 16 at a specific maximum wattage level. The variable wattage control system 10 may further comprise a micro-controller 23 which determines a power output scaling factor based on the percentage of a full line voltage being applied to the heating element 16 and then scales the power output accordingly; the power output scaling factor determining the maximum percentage power to be applied to the heating element 16. Accordingly, at least one heat-producing means 16 (whether a single or plural unit) may be driven at different power levels for various applications, and where the power rating of the variable wattage control system 10 can be greater than the power rating of the heat-producing means 16.

It is also thus seen that there is described herein a method of using a variable wattage heater control system 10 for providing varying wattage levels for a heat-producing means 16, where the heat-producing means 16 may be required to be driven at power levels less than the power level capability of the variable wattage control system 10, comprising using a temperature sensing means 18 for measurements of a temperature associated with the heat-producing means 16 during operation thereof; providing the temperature measurements to a temperature controller 14 for comparing the temperature measurements with a desired set point; using a power control means 12 of the temperature controller 14, for providing energization of the heat-producing means 16 at a selected maximum wattage level; the temperature controller 14 operating such that, if the sensed temperature, when compared to the set point, indicates that the system 10 requires heat, the temperature controller 14 directs a power controller 12 to turn on the heat-producing means 16 at a specific maximum wattage level; and using a micro-controller 23 to determine a power output scaling factor based on the percentage of a full line voltage being applied to the heat-producing means 16 and then scaling the power output accordingly as well as causing the power output scaling factor to determine the maximum percentage power to be applied to the heat-producing means 16 such that the heat-producing means 16 is not driven at a power level greater than its power level rating.

According to a further aspect of the present invention in the foregoing method for determination of the scaling factor, the method further comprises providing the scaling factor to the micro-controller through a user interface or electronic communication techniques.

According to a further aspect of the present invention in the foregoing method for determination of the scaling factor, the method further comprises providing to the micro-computer the line voltage of a power source for the power controller, electrical resistance of the heat-producing means 16 and desired maximum power of the heat-producing means 16.

Such values can be determined and manually entered or might be automatically determined, or provided through electronic communications techniques, or provided by information stored in a look-up table or otherwise reported by characteristics or features of the heat-producing means 16, such as by test or surrogate test device energization, or by fixture specification or determination, to the variable wattage control system 10.

Various precautions and operating limitations and safety features will be appropriate for skilled users making industrial application of the new system. For example, and without limitation, the variable wattage control system 10 typically can be provided with short-circuit or "full on" over-current protection or so-called "crowbar" circuit protection where the system is to make use of semiconductor-controlled devices, such as SCR's (thyristors) or bidirectional switching devices (triacs), which could fail in a shorted condition.

Further, in the case of the variable wattage control system 10 of the invention which uses phase angle controlled AC or pulsating DC control, special filtering may be used to suppress high frequency component generation in order to comply with product certification protocols or regional or approval agency criteria, such as health, safety and environmental rules or specifications establishing criteria which such devices or systems must meet to qualify for CE (Conformite Europeene) marking regulations for devices used and marketed in the European Union.

Variable wattage control system 10 of the present invention may, of course, use any of the previous power-control methods or switching protocols, such as PWM or phase control, according to whether the system 10 can be powered by a utility with regulations relating to types of power control schemes, or operating limitations thereon.

Further, in the use of the variable wattage control system 10 according to the present invention, appropriate care can be taken by those skilled in the use of the invention to avoid deleterious effects on power factor which may be of concern to utilities supplying power to be controlled by the system 10.

As a further example, rather than sensing temperature of a power-receiving device, power output or tractive force or angular velocity (as of a motor shaft) of another type of power-controlled device may be measured and applied to a device or circuit analogous to the temperature measuring and controlling means 18 or circuits of the invention, but wherein the power controller 12 provides a scaled output to the power-controlled device consistent with the principles of the invention.

It should be understood accordingly from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the

What is claimed is:

1. A variable wattage control system comprising:
   a heat-producing means which is electrically powered;
   a power control means which is linked to either a DC or AC power source for supplying power to said heat-producing means;
   a sensing means operatively associated with said heat producing means for taking temperature readings associated with said heat-producing means and communicating these readings to a temperature controller; and
   said power control means operating such that, when said temperature readings are communicated to said temperature controller by the sensing means, said temperature controller provides a re-scaled output to said power control means which limits and re-scales the output power applied to said heat-producing means by using a scaling factor in accordance with the ratings specification of said heat-producing means.

2. The variable wattage control system according to claim 1 wherein said scaling factor is manually present by user or is preset prior to shipment to an end user or is electronically communicated to the system or is determined automatically by the system in response to a user input.

3. The variable wattage control system according to claim 1 further comprising a control provision permitting a user of the system to preselect values of line voltage, resistance and a desired maximum power of said heat producing means, such that the system calculates a desired scaling factor, the desired scaling factor being applied by a software subsystem to re-scale the power out by control of voltage to said heat producing means from said power control means.

4. The variable wattage control system according to claim 3 wherein control provision is constituted by said software subsystem that permits the user to manually enter line voltage, electrical resistance of the heat-producing means and desired maximum power of the heat-producing means in order to calculate the desired scaling factor appropriate to said heating-producing means.

5. The variable wattage control system according to claim 1 wherein a software subsystem is either part of said temperature controller, or part of said power control means, or is a separate arrangement operatively associated between said power control means and said heating-producing means or between said temperature controller and said power control means.

6. The variable wattage control system according to claim 1 wherein said power control means controls power level supplied to said heating-producing means by semiconductor power control or mechanical power switching means.

7. The variable wattage control system according to claim 6 wherein said power control means controls power level supplied to said heat-producing means by phase angle control, burst firing, pulse mode, or pulse width modulation.

8. The variable wattage control system according to claim 6 wherein said power control means controls power level supplied to said heat-producing means by phase angle control, and includes circuit provision to enhance the accuracy of phase angle power control at low conduction angles, by allowing "off" cycles to occur between phase-angle-fired "on" cycles, thereby allowing an increase in the conduction angle of said phase-angle-fired "on" cycles.

9. A control system that limits wattage provided by a heating-producing element to a value less than that produced at full line voltage, the system comprising:
   at least one heat-producing means;
   a power control means operatively associated with said at least one heat-producing means; and
   a power limiting function that limits the wattage provided by said at least one heat-producing means to a value less than that produced at a full line voltage through the use of a scaling function,
   wherein said power control means is phase angle fired and includes a circuit provision to enhance the accuracy of phase angle power control at low conducting angles, by allowing one or more "off" cycles to occur between phase-angled-fired "on" cycles, thereby allowing an increase in the conduction angle of said phase-angled-fired "on" cycles.

10. A variable wattage control system for providing varying wattage levels for a power-receiving device, the system comprising:
    at least one power-receiving device operatively associated with a temperature sensing means;
    the temperature sensing means communicating with a temperature controller for comparing a sensed temperature with a predetermined set point;

a power controller operatively associated with said temperature controller for providing energization of said at least one power-receiving device at a selected maximum wattage level;

the temperature controller being operative such that, if said sensed temperature, when compared to the set point, indicates that the system requires heat, the temperature controller directs the power controller to energize said at least one power-receiving device, which is limited to a specific maximum wattage level;

a micro-controller which determines a power output scaling factor based on the percentage of a full line voltage being applied to said at least one power-receiving device and then scales said power output scaling factor accordingly;

said power output scaling factor determining the maximum percentage power to be applied to said at least one power-receiving device; and such that a said at least one power-receiving device may be driven at different power levels for various applications.

11. The variable wattage control system according to claim 10 wherein the power controller controls power to said at least one power-receiving device by conduction angle control, and includes circuitry to increase conduction angles at low power output levels.

12. The variable wattage control system according to claim 10, wherein said temperature controller operates such that temperature readings are communicated to said temperature controller by said sensing means, and when said temperature readings are so communicated, said temperature controller then provides a re-scaled output to said power controller which limited and re-scales the amount of voltage applied to said at least one power-receiving device, whereby said power controller permits multiple wattage values to be obtained from a single resistance value of said at least one power-receiving device.

13. The variable wattage control system according to claim 12, wherein said scaling allows said at least one power-receiving device having a single wattage rating to be used as a power-receiving device having multiple wattage applications.

14. The variable wattage control system according to claim 13, further being capable of powering any type of possible said at least one power-receiving device within a range of possible power ratings, and by change of said scaling factor, such that system operation is matched to a maximum desired power level of said at least one heat producing means.

15. The variable wattage control system according to claim 14, wherein said temperature controller provides a linear output range for selecting an operating power level of said at least one power-receiving device for operation thereof at a sensed temperature at said preselected set point regardless of whether the system has a maximum power level greater than that of said of at least one power-receiving device, and wherein an upper limit of said linear output range will correspond to the maximum desired power level of said at least one power-receiving device.

16. The variable wattage control system according to claim 15 wherein said linear output range is an industry standard.

17. The variable wattage control system according to claim 15 wherein said linear output range is a 40-20 mA output range.

18. The variable wattage control system according to claim 12 wherein:

said micro-controller is operative to determine a power output scaling factor according to a scaling function, based on the percentage of a full line voltage being applied to said at least one power-receiving device by first calculating available power at a full line voltage using the following equation:

$$P_{line} = \frac{(V_{line})^2}{R_{heater}}$$

and is further operative then to scale the power output to be applied to said at least one power-receiving device by calculating said power output scaling factor, $K_{out}$, using the following equation:

$$K_{out} = \frac{P_{desired}}{P_{line}}$$

said temperature sensing means being operative such that it communicates then said sensed temperature reading to the micro-controller; and said micro-controller being further operative such that it compares said sensed temperature to the predetermined set point, and determines a required percentage power output level, $P_{out}$, and then calculates a scaled percentage power output, $P_{out\ scaled}$, using the following equation:

$$P_{out\ scaled} = P_{out} * K_{out}$$

said micro-controller being still further operative to instruct said temperature controller to communicate a signal to said power controller establishing a desired power output to said at least one power-receiving device;

whereby said power controller provides a power output to said at least one power-receiving device which is properly scaled.

19. The variable wattage control system according to claim 18 wherein said micro-controller is operative as set forth in response to a software program of the system.

20. The variable wattage control system according to claim 19 wherein the micro-controller is operated by a software subsystem having said software to permit manual user input of various parameters into the variable wattage control system in order to determine said scaling function.

21. The variable wattage control system according to claim 10 wherein said scaling function is optionally manually preset or is preset prior to shipment to the end user or is electronically communicated to the system or is determined automatically by the system in response to a user input.

22. A variable control system for providing varying wattage levels for a power-receiving device, the system comprising:

at least one power-receiving device operatively associated with a sensing means for sensing an operating parameter of said power-receiving device;

said sensing means communicating with a sensor-responsive controller for comparing said sensed operating parameter with a predetermined set point;

a power control means of said sensor-responsive controller, for providing energization of said power-receiving device at a selected wattage level;

the sensor-responsive controller being operative such that, if said sensed operating parameter, when compared to the said predetermined set point, indicates the need for more power from said power-receiving device, said sensor-responsive controller directing said power control means to energize said power-receiving device, which is limited to a specific maximum wattage level;

a micro-controller which determines a power output scaling factor based on the percentage of a full line voltage being applied to said power-receiving device and then scales the power output provided to energize said power-receiving device accordingly; and said power output scaling factor determining a maximum percentage power to be applied to said power-receiving device;

such that said power-receiving device may be driven at different power levels for various applications with a power rating specification as great or less than the power rating specification of the system.

23. A method of variable wattage control comprising the steps:

a) providing an electrically powered heat-producing means, a power control means linked to a power source for supplying power to heat-producing means, a sensing means operatively associated with said heat-producing means for sensing temperature associated with the heat-producing means and communicating signals corresponding to the sensed temperature to a temperature controller for controlling the power control means to apply power to the heat-producing means according to the sensed temperature;

b) determining a scaling factor output for applying power applied to the heat-producing means by the power control means in accordance with ratings specification of said heat-producing means;

c) communicating the sensed temperature to the temperature controller;

d) causing the temperature controller to have a re-scaled output to the power control means which limits and re-scales output power from the power control means; and e) applying power from the power control means to the heat-producing means at a power level determined by the temperature controller to maintain said sensed temperature relative to a temperature set point;

whereby the power level supplied to the heat-producing means is scaled according to said scaling factor.

24. The method according to claim 23, further characterized by determining the scaling factor in accordance with the line voltage, heater element resistance and desired maximum power which can be delivered to the heat-producing means.

25. The method according to claim 23, further characterized by:

f) employing a software subsystem that permits a user of the system to enter line voltage, heater element resistance and desired maximum power to the heat-producing means; and g) calculating by said software subsystem a desired scaling factor.

26. The method according to claim 23 wherein said scaling factor is manually preset by a user or is preset prior to shipment to an end user or is electronically communicated to the system or is determined automatically by the system in response to a user input.

27. A method of variable wattage heater control comprising the steps of:

a) providing an electrically powered heater, a power control means linked to power source for supplying power to the heater, a sensing means operatively associated with the heater for sensing temperature associated with the heater and communicating signals corresponding to the sensed temperature to a temperature controller for controlling the power control means to apply power to the heater according to the sensed temperature, b) employing a micro-controller to determine a power output scaling factor according to a scaling function, based on the percentage of a full line voltage being applied to the heater, by first calculating available power at full line voltage using the following equation:

$$P_{line} = \frac{(V_{line})^2}{R_{heater}}$$

c) then scaling the power output applied to the heater by calculating said power output scaling factor, $K_{out}$, using the following equation:

$$K_{out} = \frac{P_{desired}}{P_{line}}$$

d) operating the temperature sensing means such that it communicates the sensed temperature reading to the micro-controller;

e) operating the micro-controller such that it compares the sensed temperature to a predetermined temperature set point and determines a required percentage power output level, $P_{out}$, and then calculates a scaled percentage power output, $P_{out\ scaled}$, using the following equation:

$$P_{out\ scaled} = P_{out} * K_{out}$$

and f) operating the micro-controller such that said micro-controller instructs the temperature controller to communicate a signal to the power control means and establishing the desired power output to the heater element;

whereby the power control means provides a power output to the heater which is properly scaled for the heater.

28. A method of using a variable wattage control system for providing varying wattage levels for a heating element, where the heating element may be required to be driven at power levels less than a power level capability of the system comprising the steps of:

a) using a temperature sensing means for measurements of a temperature associated with the heating element during operation thereof;

b) providing the temperature measurement to a temperature controller for comparing the temperature measurements with a predetermined set point;

c) using a power control means of the temperature controller, for providing energization of the heating element at a selected wattage level;

the temperature controller operating such that, if the sensed temperature, when compared to the predetermined set point, indicates the system requires more heat, the temperature controller directs said power control means to energize the heating element, which is limited to a specific maximum wattage level; and d) using a micro-controller to determine a power output scaling factor based on the percentage of a full line voltage being applied to the heating element; and e) scaling the power output provided to energize the heating element accordingly; and f) causing the power output scaling factor to determine the maximum percentage power to be applied to the heating element; such that the heating element is not driven at a power level greater than its power level rating.

29. The method according to claim 28 wherein, said step d) further comprises providing to the micro-controller the line voltage of a power source for the power control means, electrical resistance of the heating element and desired maximum power of the heating element.

* * * * *